Aug. 8, 1950        R. H. VARIAN        2,517,612
STABLE PLATFORM

Filed March 29, 1947        3 Sheets-Sheet 1

INVENTOR.
RUSSELL H. VARIAN
BY

Aug. 8, 1950  R. H. VARIAN  2,517,612
STABLE PLATFORM
Filed March 29, 1947  3 Sheets-Sheet 2

INVENTOR
RUSSELL H. VARIAN
BY
Herbert H. Thompson
his ATTORNEY

Aug. 8, 1950  R. H. VARIAN  2,517,612
STABLE PLATFORM
Filed March 29, 1947  3 Sheets-Sheet 3
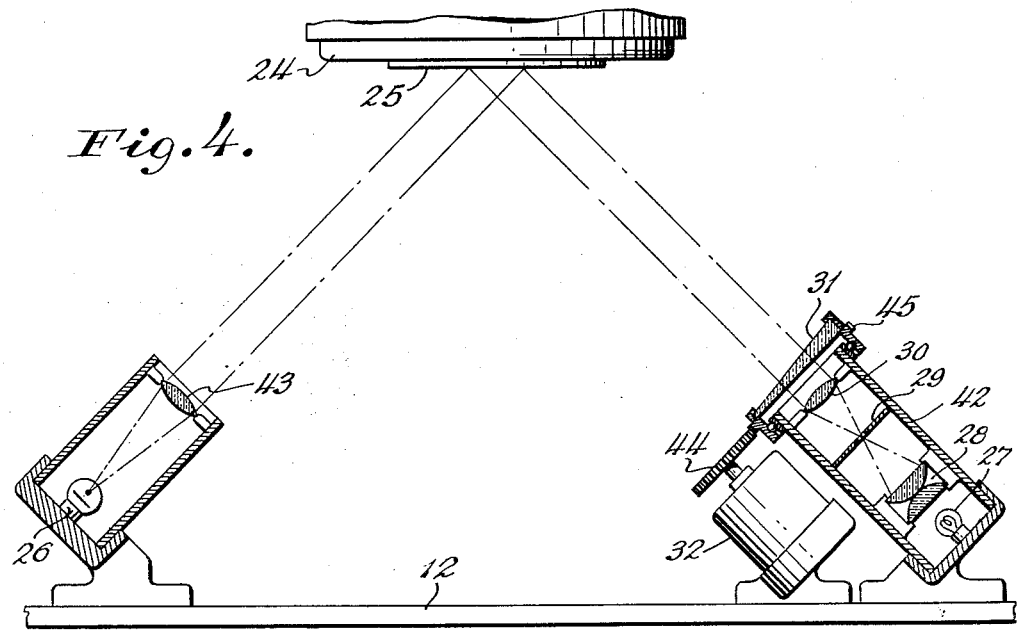
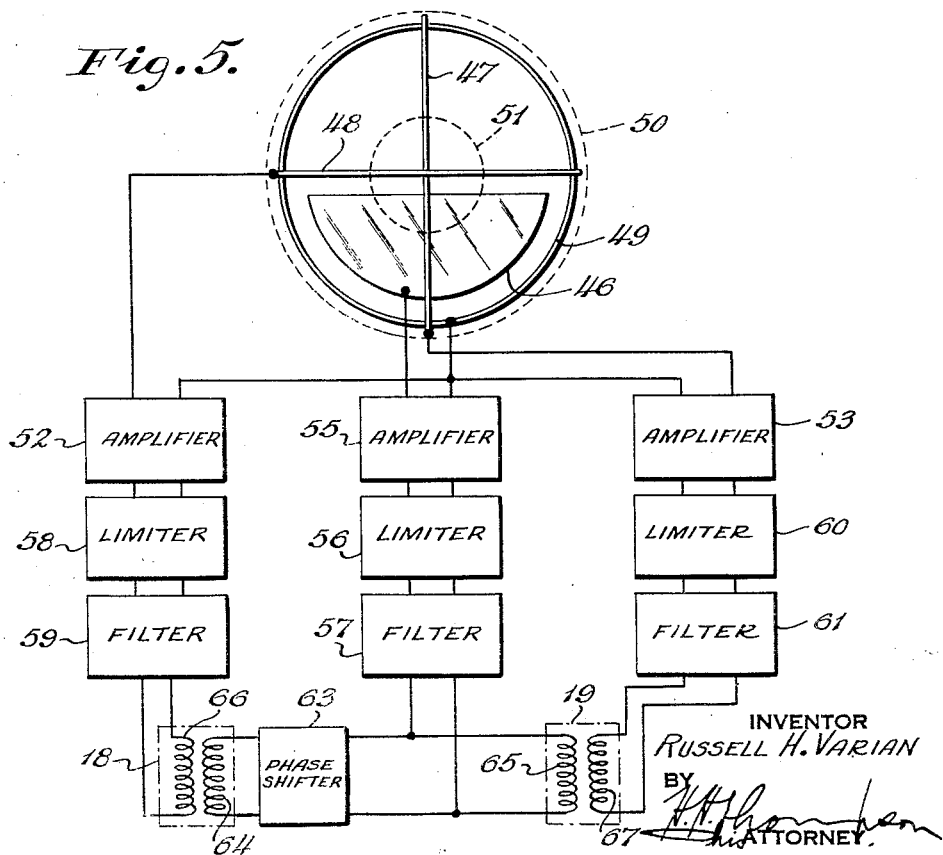
INVENTOR
RUSSELL H. VARIAN
BY
ATTORNEY Patented Aug. 8, 1950

2,517,612

UNITED STATES PATENT OFFICE 2,517,612

STABLE PLATFORM

Russell H. Varian, Palo Alto, Calif., assignor to The Sperry Corporation, a corporation of Delaware Application March 29, 1947, Serial No. 738,241

11 Claims. (Cl. 74—5.34)

This invention relates to a gyroscopically stabilized platform for use in ships, aeroplanes and other movable craft. Such a platform, maintaining a substantially horizontal attitude in spite of the motions of the craft which carries it, has many useful applications. It may be used as a datum from which the roll and pitch of the craft may be measured; it may serve as an artificial horizon for measuring the zenith distance of heavenly bodies in navigation, or as a reference base for setting the required superelevation of pieces of ordnance in fire control, and for many other purposes.

A feature of the invention lies in the means of measuring the angles of roll and pitch of the craft, and controlling power-driven transmitters of these angles so that secondary artificial horizons may be operated in various parts of the ship to maintain their planes parallel to the primary or master platform.

A further feature of the invention resides in the novel means of applying powerful servo control to stabilize the platform whereby advantage is taken of the static and gyroscopic inertia of the apparatus to enhance the quickness of response of the servo system, whereas such inertia has hitherto been a hindrance to quick and accurate following.

The invention also relates to the novel features or principles of the instrumentalities described herein, whether or not such are used for the stated objects, or in the stated fields or combinations. Thus while I have shown my invention as employing a gravity reference, other geophysical attribute properties of the earth may be employed from which my gyro system is controlled, such as the earth's magnetic field or the direction of the earth's spin axis.

Other features and advantages of the said invention together with one manner in which it may be carried into effect will appear from the accompanying drawings.

Figure 1:
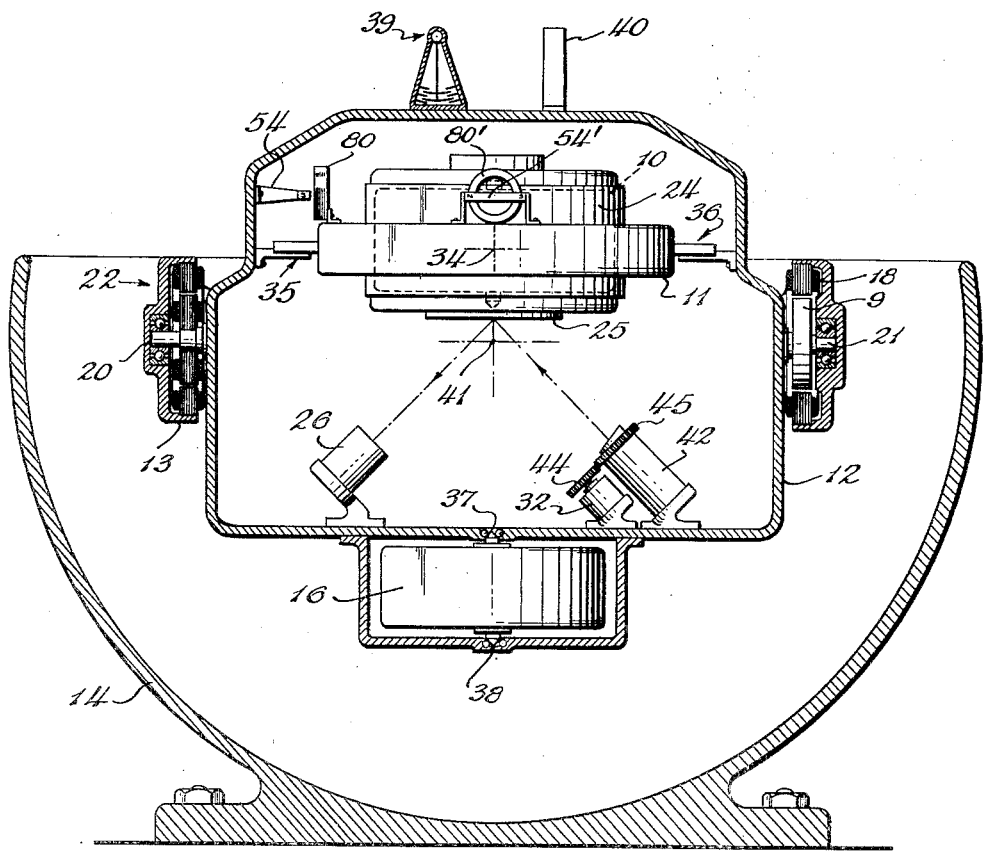
Figure 1 is an elevation of the stabilized platform, partly in section.
Figure 3:
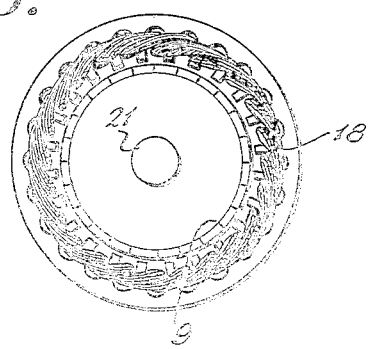
Figure 7:
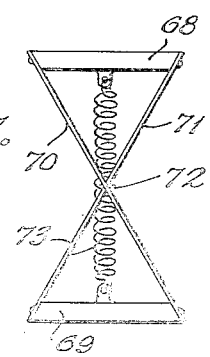
Figure 6:
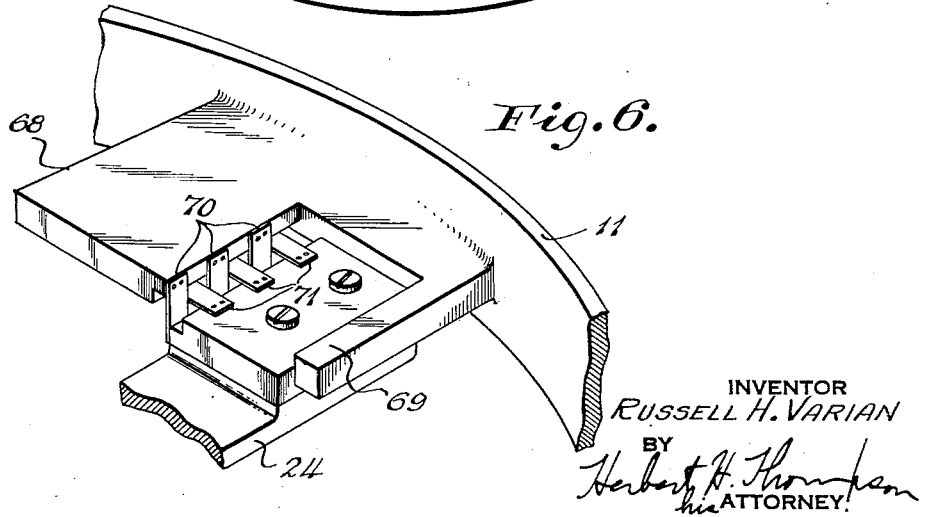

Figure 3 shows in section a torque motor for causing precession of the servo-gyro, Figure 4 is a diagram in section of the optical pick-off device shown in outline in Figure 1, Figure 5 is a diagram showing the connections of the photo-cell of Figure 4 and the amplifiers and other apparatus associated therewith, Figure 6 shows one form of flexible suspension, and Figure 7 shows a second form of flexible suspension.

Figure 2:
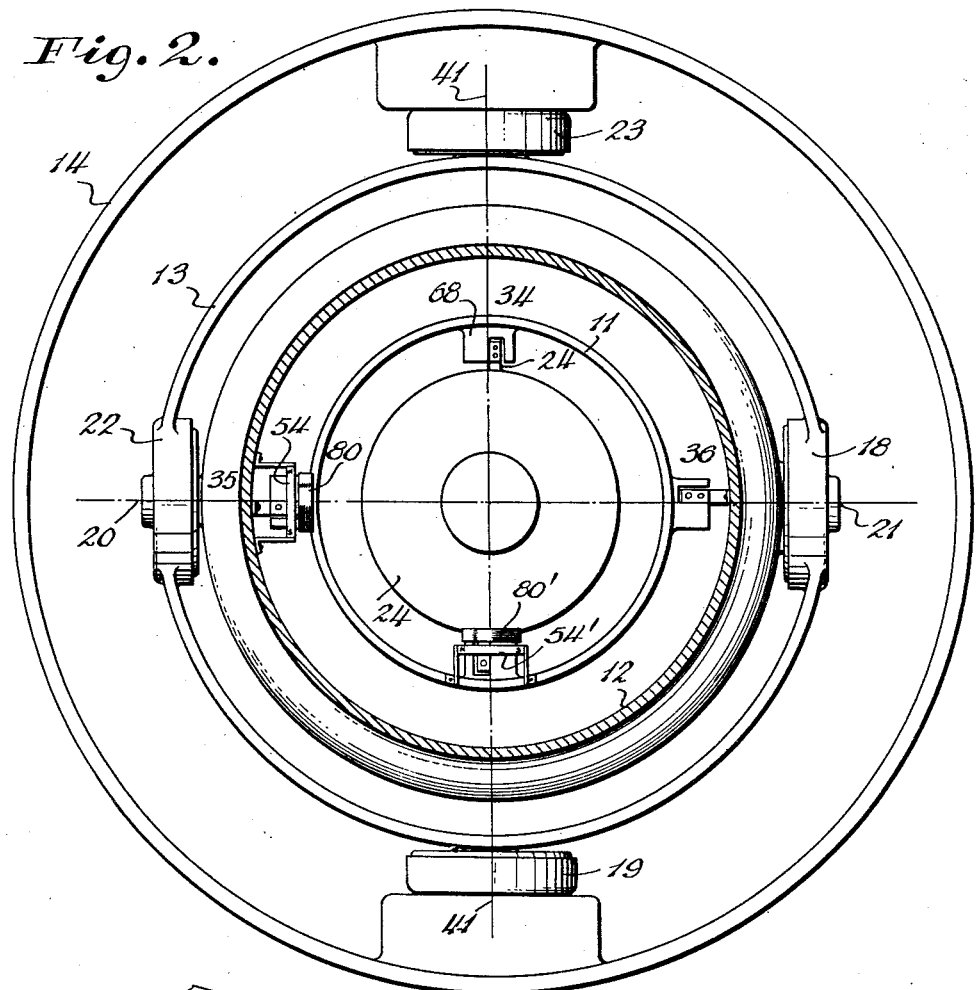
Figure 2 is a plan view partly in section of the stabilized platform.

Referring to Figs. 1 and 2, a frame 12 is supported by anti-friction bearings 20, 21 for rotation round a horizontal axis in a gimbal ring 13. Said ring is similarly supported for rotation round a horizontal axis 41, in an outer base 14 secured to the deck of the ship. This construction allows frame 12 to maintain a horizontal position in spite of roll and pitch of the ship.

In the upper part of frame 12 is mounted a sensitive gyroscopic element 10, preferably in the form of a single rotor with its spin axis normally vertical, said rotor being enclosed in the casing 24. Said casing is suspended for rotation round horizontal axis 34 in gimbal 11 which is suspended for rotation round axis 35, 36 inside frame 12. A second gyro 16 is mounted to spin about a vertical axis in ball bearings 37, 38 carried directly in frame 12. The rotors are electrically maintained in high speed rotation in the usual way, and the lower part of frame 12 is preferably formed as an airtight enclosure for gyro 16.

The sensitive gyro 10 and its casing 24 are erected to hold the vertical by conventional means; for instance the arrangement shown in Braddon, Beach, DeLanty and Vacquier, Ser. No. 608,140, Fig. 7 is suitable. As shown in Fig. 1 of the present application this arrangement consists of a pair of small damped pendulums 39, 40 mounted on top of frame 12 so as to be free to swing in vertical planes at right angles, said planes being parallel to the gimbal axes 35, 36 and 34 respectively. These pendulums carry each one set of plates of a variable capacity condenser, the other sets of plates being fixed to frame 12. On being energized from a suitable source of high frequency alternating potential, said capacities give a signal proportional to the angular tilt of frame 12 with respect to the pendulum plumb line, and after suitable amplification and rectification said signals are applied to torque devices causing precession of gyroscope 10 about the horizontal gimbal axes. The torque device controlled by pendulum 39 consists of a coil 80 mounted on gimbal ring 11 which coil receives the rectified, amplified signal from the amplifier and co-operates with the permanently energized magnet 54 carried on frame 12 to apply a torque about axis 35, 36. Similarly the signal from pendulum 40 controls the current in coil 80' mounted on the gyro casing 24 which co-operates with magnet 54' carried by gimbal ring 11 to exert a torque round axis 34.

It will be observed that whereas the signals given by the pendulums 39 and 40 are governed by tilting of the frame 12, the resulting torques are applied to the gyro 10.

However, as will next be described a second followup system is provided according to this invention to cause the gyro 16, and with it the frame 12, to follow very closely all the movements of gyro 10.

The control of gyro 10 by the pendulums 39 and 40 is arranged to be very gentle, so that the rate of precession of this gyro will be very slow. With this object, gyro 10 with its casing 24, gimbal ring 11, and parts attached thereto, are carefully balanced so as to be in neutral equilibrium. The suspensions at axes 35, 36 and 34 are arranged to be substantially free from friction, by means hereinafter described. Since any disturbing forces which can act on gyro 10 are thereby made very small, the correcting torques due to coils 80 and magnets 54 may also be small. Temporary displacement of the pendulums from the true vertical due to short-lived lateral accelerations, will therefore produce very small deviations of the axle of gyro 10 which will indicate the mean vertical as shown by the pendulums with a high degree of accuracy.

On the other hand, the follow-up action of gyro 16 is made prompt and powerful so that said gyro will faithfully hold its axle parallel to the axle of gyro 10 in spite of large disturbing torques such as may be caused for instance by the reactions of the transmitting devices which form part of the invention.

With this object, an electromagnetic torque or follow-up motor 18, 19, Figs. 1 and 2, is mounted to act on each of the horizontal gimbal axes of the frame 12. As shown in Fig. 3, the torque-motor acting round axis 20, 21 consists of a wound two phase stator 18 mounted on gimbal ring 13 and a squirrel cage rotor 9 fixed to the axle of frame 12. A similar motor (Fig. 2) is provided to act round axis 41, the stator 19 in that case being fixed to the base 14, and the rotor fixed to the axle of gimbal 13. The construction of the torque motors may be the same in both cases and may be of any conventional form.

The torque applied by these motors causes the gyro 16 to precess, and it is important that the control of these motors should cause such precession as will bring the axle of gyro 16 into line with the axle of gyro 10, but without applying any disturbing forces which might cause the sensitive gyro 10 to deviate.

With this object a suitable pick-off or sensitive controller for the torque motors is provided. For this purpose, a photoelectric system is shown comprising a mirror 25 fixed to the under side of gyro casing 24, see Fig. 4. A projector tube 42 mounted on frame 12 contains a light source 27 the light from which passes through condenser lens 28 and is brought to a focus at a pinhole in diaphragm 29 which thus becomes virtually a bright point source. The light from the pinhole is then collimated by lens 30, passes through the rotating prism 31 and is reflected by mirror 25 through a second condenser 43 and brought to a focus on the surface of a photo-electric cell 26 of special construction to be described hereinafter. The photo-cell is mounted on frame 12.

The prism 31 of small angle is rotatably mounted at the mouth of projector tube 42, for rotation about the optical axis of the lens system therein and is rotated by synchronous electric motor 32 through gears 44 and 45. The spot of light which is the image of pinhole 29 focussed on photo-cell 26 therefore describes a small circle, the radius of which is fixed by the angle of prism 31 while the position of the center of said circle depends on the inclination of gyro casing 24 and mirror 25 with respect to frame 12.

Fig. 5 shows the construction of the photoelectric cell and its connections to the torque motors. The evacuated transparent envelope of the cell, indicated by the outer dotted circle 50, contains four electrodes. The circular path of the light spot is shown by the inner dotted circle 51. Two electrodes 47 and 48 are photo-sensitive cathodes in the form of wires stretched diametrically across the cell at right angles. A third photo-sensitive cathode 46 is in the shape of a semicircular plate. The common anode 49 is in the form of a wire ring. The four electrodes are arranged at slightly different levels so as not to be in contact with one another.

As the light spot travels quickly round the circle 51, the D-shaped cathode 46 emits current pulses of the same frequency as the rotation of the prism 31. These pulses are amplified by the amplifier 55 and then go through amplitude limiter 56, which produces a flat-topped wave form, and through a frequency filter 57 which attenuates harmonics of the prism rotation frequency. The alternating current output is then supplied to the constant phase winding 65 which is one of the two windings of stator 19 of the two-phase torque motor acting round axis 41 of the frame 12, and as another constant phase to coil 64 of the two windings of the rotor 18 of the corresponding motor which acts about axis 21. The last-named winding is fed through a 90° phase shifting network 63 for a reason that will appear hereinafter.

The two wire cathodes 47 and 48 of the photo-cell are each traversed twice per revolution by the spot of light, and so long as the circle 51 is centered at the intersection of these two wires each wire will emit pulses of current at twice the frequency of rotation of prism 31, and differing in phase from each other by 90°. These two sets of pulses are amplified by amplifiers 52 and 53 respectively. The outputs of these amplifiers then pass through amplitude limiters 58 and 60 and through frequency filters 59 and 61.

These filters are constructed to pass only frequencies equal to the speed of rotation of prism 31, and the double frequency voltages will be unable to pass through them to the variable phase windings 66, 67 of the torque motors.

When, however, the axle of gyro 16 is no longer parallel with the axle of gyro 10 the mirror 25 will be tilted with respect to the projector 42 and photo-cell 26 with the consequence that the center of the circular light path 51 will no longer coincide with the intersection of the wires 47 and 48. Let it be supposed, for the sake of example that said center moves away from wire 47 but remains on wire 48. Then the pulses from wire 47 will no longer be equally spaced but will be separated by alternate long and short intervals. The output from amplifier 53 will then contain a component at half the frequency of the pulses but equal to the frequency of the output from semicircular plate 46 and displaced 90° in phase therefrom. Said component from wire 47 and amplifier 53 will then be able to pass through filter 61 and energize the variable phase winding 67 in quadrature with the fixed phase winding 65 of the torque motor. The motor thus supplied with two-phase current will then exert a torque through frame 12 on gyro 16 causing it to precess and line up its axle with the axle of the gyro 10 in which state the current through winding 67 will cease and the motor will become inactive.

It will be observed that as the center of the light path 51 passes from left to right across wire 47, the low frequency component of the signal from said wire changes its phase by 180° and the torque of motor 65, 67 will therefore reverse as requisite to cause precession in the required direction.

Similarly, if the center of circle 51, is displaced to one side or the other of photo-active wire 48, the signal from that wire will contain a half-frequency component which after passing through amplifier 52 and limited 58, will also pass filter 59 and energize the variable phase winding 66 of the second torque motor and in co-operation with fixed phase 64 will cause precession of gyro 16 in the required sense to bring the center of circle 51 back to the wire 48.

Since wire 48 is parallel to the straight side of plate cathode 46 the outputs of the two would normally be in phase with one another for which reason the phase-shifting network 63 is put in circuit with coil 64 to change its phase permanently by substantially a right angle.

In this way powerful erecting torques may be applied to gyro 16 to align it with gyro 10 entirely by the control of mirror 25 and without any reaction on gyro 10.

The motor 32 which drives prism 31 fixes the basic frequency of the electrical follow-up circuits. Said motor may conveniently consist of a single phase self-starting synchronous motor such as is used for electric clocks. The motor may be supplied from an external source of suitable frequency and, if the gyro rotors 10 and 16 are driven as usual, by poly-phase electric motors, one of the phases of the supply may be used to feed motor 32.

It will be observed that the alternating current derived from the semicircular or D-shaped electrode 46 in Fig. 4 through amplifier 55 has a frequency equal to the speed of rotation of the prism 31. In some cases it may be convenient to make the prism driving motor 32 as a two-pole machine geared to run at the same speed as the prism. In such a case the source of single phase current that supplies motor 32 may also be used to energize the fixed phase coils 64 and 65 of the follow-up motor. The D shaped cathode 46 of the photo-cell may then be dispensed with together with the amplifier 55 and limiter 56 associated therewith. In view, however, of the elastic coupling between the electrical windings of motor 32 and the mechanical rotation of the prism, there may be variable phase difference between the output from cathodes 47 and 48, and the input to the fixed phase coils 64 and 65, which differences may interfere with the close following up of the gyro. For this reason the arrangement shown in Fig. 5 is to be preferred.

By using considerable gain in amplifiers 52 and 53, followed by drastic amplitude limitation a steep response curve of the torque motors will be obtained so that a powerful torque will be exerted on very small departures from alignment.

In the usual phantom system, the torque of the follow-up motor causes an acceleration of the phantom with a tendency to hunt that is very difficult to suppress. In the present invention, where the phantom is controlled by a gyroscope, the torque motors produce a velocity of precession, and this allows of very "tight" following with substantially no lag and no tendency to hunt.

An important consequence of this close follow-up is that there is only a very small angular motion of gyro casing 24 round axes 34, 35 and 36 relative to frame 12. In the present invention advantage is taken of this condition to employ a novel form of hinge in place of bearings at the said gimbal axes. By this means all sliding or rolling friction is abolished and the axis of rotation, for small angles, is definitely fixed so that the balance of the gyro in the gimbals is permanent.

One form of this hinge is shown in Fig. 6 as applied to act between the gimbal ring 11 and gyro casing 24. In this case a stout slotted plate 68 projects inwardly from the gimbal ring and a corresponding plate 69 is screwed to a boss on the gyro casing. Plate 69 is suspended by one edge from plate 68 by a plurality of thin strips 70 of tempered steel or similar material. The arrangement is similar to the conventional suspension for heavy pendulums of clocks, which, as is well known, oscillate through an angle of a few degrees about an axis which is fixed at a point substantially level with the middle of the suspension spring.

In the case of apparatus to be used in moving craft, however, it is necessary to provide a lateral constraint, and this is given, in the present invention, by a plurality of horizontal springs 71 spaced between springs 70 and connecting plates 68 and 69 in the manner shown. The axis of oscillation is defined by the intersection of the two planes containing the two sets of springs. There is then no friction except internal molecular friction of the spring material, and the freedom is independent of lubrication or dirt. A slight constraint is introduced by the stiffness of the spring material, but this is minimized by making the springs very thin (since the stiffness varies as the cube of the thickness) and increasing the aggregate axial width of the springs (which affects the stiffness in direct proportion) to obtain adequate cross-sectional area to sustain the load. Moreover, as the angle of flexure of the springs can be kept within a small fraction of one degree by the close following of frame 12, the disturbance of gyro 10 due to stiffness of the springs can be made negligibly small.

In Fig. 6 while the vertical springs 70 are always in tension the horizontal springs 71 may be put in either tension or compression by lateral loads. In cases where this lack of symmetry is undesirable the alternative arrangement of Figure 7 may be used. In this case the plate 69 is supported from plate 68 by thin leaf springs 70, 71 which are equally inclined to the vertical and normally at equal tensions. Figure 7 is an end view of said springs and it will be understood that the lines 70 and 71 each represent a plurality of such springs interlaced as in Figure 6. The intersection at 72 of the planes of the two sets of springs marks the axis of relative rotation of the two plates 68 and 69 and, for small angles of rotation is substantially a fixed straight line.

It has been remarked herein that when the gyro system is suspended on flexible ribbons or springs as shown in Figures 6 and 7, the stiffness of the spring material introduces a restoring couple tending to bring the plates 68 and 69 parallel to each other, and, when the plates are not parallel, this couple can not be of zero value although it may be made small by using thin ribbons or leaf springs of elastic material. For the small angles of flexure contemplated by the present invention it is possible to introduce an equal and opposite compensating couple which will nullify the effects of the stiffness of the ribbons. This device is shown in Figure 7 where 73 shows a helical spring stretched across from plate 68 to plate 69 with its axis intersecting the hinge-axis at 72, under the normal conditions in which the ribbons 70 and 71 are free from flexure. The tension of spring 73 then exerts no turning moment round axis 72.

If now plate 69 is given a slight tilt relative to plate 68, the axis of spring 73 will pass to right or left of intersection 72 and the tension of spring 73 will have a moment tending to increase the existing tilt of plate 68. At the same time the ribbons 70 and 71 by their stiffness will tend to decrease said tilt of plate 68. It will therefore be obvious that by proper adjustment of the tension of the helical spring 73 the effect of the stiffness of the ribbons 70 and 71 may be compensated for very accurately for small angles of tilt. Because of the close following of frame 12 and gyrocasing 24, the relative tilting of plates 68 and 69 respectively attached thereto will always be kept within small angular limits. Hence, by the combination of several features of the invention, the gyro 10 is effectually relieved of all angular constraint from the suspension, and acts as a very accurate indicator of the vertical.

Gyro 16, being slaved to follow gyro 10 also indicates the vertical with similar precision, and one of the objects of the invention is to measure and transmit to receiving stations the angles of roll and pitch of the craft from the vertical. With this object electrical transmitters 22 and 23, Fig. 2, are fitted on gimbal axes 20 and 41 respectively, to transmit the angular rotations about the gimbal pivots. The torque for driving said transmitters is derived in the first instance from the gyroscopic inertia of gyro 16, which by its very immobility acts to drive the transmitters in the required direction through the proper angle. The reaction of said driving torque however, causes a slight precession of the gyro and this brings the photoelectric follow-up device into play, energizing one or both of the follow-up motors 18 and 19, and causing them to back up the gyro 16. The energy for driving the transmitters is therefore ultimately derived from the follow-up motors, but the initial instantaneous torque is provided by the gyroscope itself thus eliminating lag between the actual angular movement of the ship and the indication thereof by the transmitter.

Transmitters of angular indications of many types are well known in the art and are not per se part of this invention. A self-synchronous type of transmitter or Selsyn is well adapted for the purposes of this invention, and may be mounted directly on the gimbal pivots for direct drive at one-to-one speed ratio, or the transmitter may be driven at a higher speed through gearing.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A gyroscopic stabilized platform for use in movable craft having a base, a frame gimballed on said base, a sensitive gyro vertical in a casing, flexible ribbons supporting said gyro casing, a gimbal ring supporting said ribbons, a second set of flexible ribbons supporting said gimbal ring in said frame, pendulum controlled torque producing means for securing vertically of the axle of said gyro, a second vertical axis gyro rotatably mounted in said frame and constrained to tilt therewith, a mirror carried by the casing of said first gyro, a multi-electrode photo-sensitive cell supported by said frame, torque motors controlled through amplifiers by said photo-cell and adapted to apply torques round the gimbal axes of said frame, a rotating prism, a light projector carried by said frame and adapted to throw a beam of light through said prism for reflection by said mirror on to said photo-cell so as to cause said torque motors to align said frame and second gyro with said first gyro and transmitters driven coaxially with said torque motors for transmitting angles of roll and pitch of the craft which carries it relative to said stabilized platform.

2. In a gyroscopically stabilized platform for use in movable craft the combination with a sensitive gyro vertical of a gyro servo system comprising a universally mounted follow-up frame supporting said gyro vertical in gimbals, a servo-gyro journalled for rotation about a vertical axis in said frame normally in line with the axis of said gyro vertical and stabilizing said frame to an approximate degree by gyroscopic inertia, torque-producing means for causing precession of said servogyro about an axis, transmitting means for transmitting the angles of roll and pitch of the craft relatively to said frame and control means adapted to energize said torque producing means whenever the axle of said servogyro is out of alignment with said gyro vertical causing it to precess into alignment with said gyro vertical.

3. In a gyroscopically stabilized platform comprising a sensitive gyro vertical, a servogyro, a first universal support for both gyros, and an additional universal support for said sensitive gyro; a pick-off device having a light source, giving a beam of light, means for causing said beam continuously to sweep out a cone, a reflector, one of said source or reflector being carried by said first support and the other by said sensitive gyro, a photo-sensitive cell on to which said rotating beam of light is reflected by said reflector, said photo-cell being adapted to give a signal depending on asymmetry of the incidence of said light beam on said cell, and a plurality of torque motors acting about different axes of said first support adapted to be controlled by said signal.

4. In a gyroscopically stabilized platform, a follow-up device comprising a light source, a mirror, a rotating prism and a photo-cell so constructed and arranged that a focussed image of the said source after reflection in the mirror is caused by said prism to execute a circular orbit upon the cathodes of the photo-cell, the position of the center of said orbit depending on the relative inclination of said mirror and light source, said photo-cell comprising two diametral cathodes at right angles giving a component signal at the frequency of the rotation of said image when the orbit is not centered at the intersection of the said cathodes, and a third cathode giving a signal of constant phase at rotation frequency independent of the centering of the orbit.

5. In a gyroscopically stabilized platform, a sensitive gyro vertical, a gimbal ring and follow-up frame power driven to follow very closely the motions of the gyro vertical, characterized by having hinges or joints at the horizontal axes by which the gyro vertical is supported in the gimbal ring, and the gimbal ring is supported in the frame, each of said hinges comprising a plurality of parallel leaves or strips of elastic material disposed in a vertical plane and attached at one end to the part supported and at the other end to the supporting part, and a second plurality of similar leaves alternating with the first and disposed in a horizontal plane, the intersection of said vertical and horizontal planes constituting the axis of rotation.

6. In a gyroscopically stabilized platform, a sensitive gyro vertical, a gimbal ring and follow-up frame power driven to follow closely the motions of the gyro vertical, characterized by having hinges or joints at the horizontal axes by which the gyro vertical is supported in the gimbal ring, and the gimbal ring is supported in the frame, each of said hinges comprising a plurality of leaves of elastic material disposed in two intersecting planes the line of intersection marking the axis of the hinge, said leaves connecting the supporting part to the part to be supported, said hinge further comprising a tension spring having one end attached to the support and one end attached to the part supported so that the axis of the hinge, said tension spring being adjusted so as substantially to counterbalance the stiffness of said leaves for small angles of displacement.

7. A gyroscopically stabilized platform for use in movable craft comprising a normally horizontal frame suspended with freedom to tilt in any direction relatively to said craft, a sensitive gyro vertical suspended from said frame with freedom to tilt in any direction relatively thereto, a servogyro fixedly mounted to spin about a normally vertical axis in said frame, torque producing means for causing precession of said servogyro about any horizontal axis and consequent tilting of said frame, and control means adapted to come into action on any departure from parallelism of the spin axis of the two gyros thereby energizing said torque producing means so as to cause precession of said servogyro and maintain the frame horizontal.

8. In a gyroscopically stabilized platform, a sensitive gyro vertical, a follow-up element comprising a second gyro vertical and control means responsive to relative angular movement between the axes of the two gyros, said control means being arranged to cause said second gyro to precess and follow the relative angular movements of said first sensitive gyro vertical.

9. In a gyroscopically stabilized platform for use in movable craft, a sensitive gyro vertical, a follow-up element including a second gyro vertical on said platform, transmitters for transmitting to a distance the angles of roll and pitch of the craft relatively to said platform, and control means responsive to relative angular movement between the axes of the two gyros, said control means being adapted and arranged firstly so as to cause said second gyro to precess and follow the angular movements of said first gyro and to thereby stabilize the platform and drive said transmitters.

10. In a stabilized platform, a universal support for the platform, a gyroscopic element rotatably mounted on said platform, a second gyroscopic element supported on said platform with three axes of freedom, means for detecting relative displacement of the axis of rotation of the first gyroscopic element and one of the axes of freedom of said second gyroscopic element from a prescribed relationship, means connected to said support controlled by said detecting means for eliminating said displacements, and means controlled by the attitude of said stabilized platform with respect to a force field due to the earth for orienting said second gyroscopic element.

11. In a gyroscopically stabilized platform comprising a sensitive element and a power driven following element, a follow-up device including a light source, an optical system forming an image of said source moving so as to trace a pattern located according to the angle between said sensitive and following elements, a photo-sensitive cell with three cathode elements, two of said cathodes being arranged in cruciform fashion so as to give alternating current signals of variable phase depending on the asymmetry of the pattern traced by said image on the cell and the third cathode being so shaped and placed as to give a signal of substantially constant phase, and a pair of electric alternating current torque motors for aligning the following and sensitive elements, one of said torque motors being energized by one of the variable phase signals and the constant phase signal and the other of said torque motors being energized by the other of the variable phase signals and the constant phase signal.

RUSSELL H. VARIAN.

REFERENCES CITED

The following references are of record in the file of this patent:

UNITED STATES PATENTS

| Number | Name | Date |
|---|---|---|
| 1,446,348 | Hort | Feb. 20, 1923 |
| 1,603,352 | Paxton | Oct. 19, 1926 |
| 1,999,646 | Wittkuhns | Apr. 30, 1935 |
| 2,180,859 | Borchers | Nov. 21, 1939 |

FOREIGN PATENTS

| Number | Country | Date |
|---|---|---|
| 646,425 | Germany | June 14, 1937 |
| 200,833 | Great Britain | Oct. 4, 1923 |